(12) United States Patent
Park (10) Patent No.: US 9,248,764 B2
(45) Date of Patent: Feb. 2, 2016

(54) APPARATUS FOR ADJUSTING HEIGHT OF ARMREST OF CONSTRUCTION MACHINE

(75) Inventor: Hyun-Soo Park, Busan (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 0 days.

(21) Appl. No.: 14/418,704

(22) PCT Filed: Aug. 8, 2012

(86) PCT No.: PCT/KR2012/006317
§ 371 (c)(1),
(2), (4) Date: Jan. 30, 2015

(87) PCT Pub. No.: WO2014/025077
PCT Pub. Date: Feb. 13, 2014

(65) Prior Publication Data
US 2015/0165941 A1 Jun. 18, 2015

(51) Int. Cl.
*B60N 2/46* (2006.01)
*B60N 2/24* (2006.01)
(Continued)

(52) U.S. Cl.
CPC ............... *B60N 2/464* (2013.01); *B60N 2/24* (2013.01); *B60N 2/38* (2013.01); *B60N 2/46* (2013.01); *E02F 9/166* (2013.01)

(58) Field of Classification Search
CPC ............ B60N 2/464; B60N 2/46; B60N 2/38; B60N 2/24
USPC ..................................... 297/411.36
See application file for complete search history.

(56) References Cited

U.S. PATENT DOCUMENTS 5,324,096 A * 6/1994 Schultz .............. A47C 1/03
297/411.36
6,062,647 A * 5/2000 Mei ................. A47C 1/03
297/411.36
(Continued)

FOREIGN PATENT DOCUMENTS

JP 10-331199 A 12/1998
JP 2000-328602 A 11/2000
(Continued)

OTHER PUBLICATIONS

International Search Report (in Korean and English) and Written Opinion (in Korean) for PCT/KR2012/006317, mailed Feb. 20, 2013; ISA/KR.

*Primary Examiner* — Anthony D Barfield
(74) *Attorney, Agent, or Firm* — Harness, Dickey & Pierce, P.L.C.

(57) ABSTRACT

Disclosed is an apparatus for adjusting the height of an armrest, capable of adjusting the heights of the arm rests arranged at the left and right sides of a driver's seat, respectively, in the vertical direction according to the physical condition of the driver. According to the present invention, the apparatus for adjusting the heights of the armrests arranged at the left and right sides of the driver's seat of a construction machine, respectively, comprises: an inner rail which is mounted on the driver's seat and in which joint protrusions are formed on a guide rail unit such that the joint protrusions maintain equal spacing in the vertical direction; an outer rail which is coupled to the inner rail such that the outer rail is slidable in the vertical direction, and which is mounted on the side surfaces of the armrests; a locker which is rotatably mounted on the outer surface of the outer rail, and which has, at the lower end thereof, locking grooves into which the joint protrusions are to be fitted; an adjustment lever which is fixed at the locker, and which presses a handle unit so as to enable the joint protrusions to be withdrawn from the locking grooves when the locker rotates about a fixing pin; and a connection member for connecting the lower end of the locker to the lower end of the outer rail.

7 Claims, 9 Drawing Sheets

(51) Int. Cl.
*B60N 2/38* (2006.01)
*E02F 9/16* (2006.01)

(56) References Cited

U.S. PATENT DOCUMENTS 7,156,466 B1 * 1/2007 Chang .................... A47C 1/03
297/411.36

2008/0036264 A1 * 2/2008 Pan ......................... A47C 1/03
297/411.36
2013/0033082 A1 * 2/2013 Huang ..................... A47C 1/03
297/411.36

FOREIGN PATENT DOCUMENTS

KR 20-0116860 Y1 5/1998
KR 10-2008-0006726 A 1/2008

* cited by examiner

FIG. 1

Prior art

APPARATUS FOR ADJUSTING HEIGHT OF ARMREST OF CONSTRUCTION MACHINE

TECHNICAL FIELD

The present invention relates to an apparatus for adjusting the height of armrests of a seat for a construction machine. More particularly, the present invention relates to such an apparatus for adjusting the height of armrests of a seat for a construction machine, in which the height of armrests installed on the left and right sides of an operator's seat can be variably adjusted vertically depending on the operator's physical conditions.

BACKGROUND OF THE INVENTION

Figure 1:
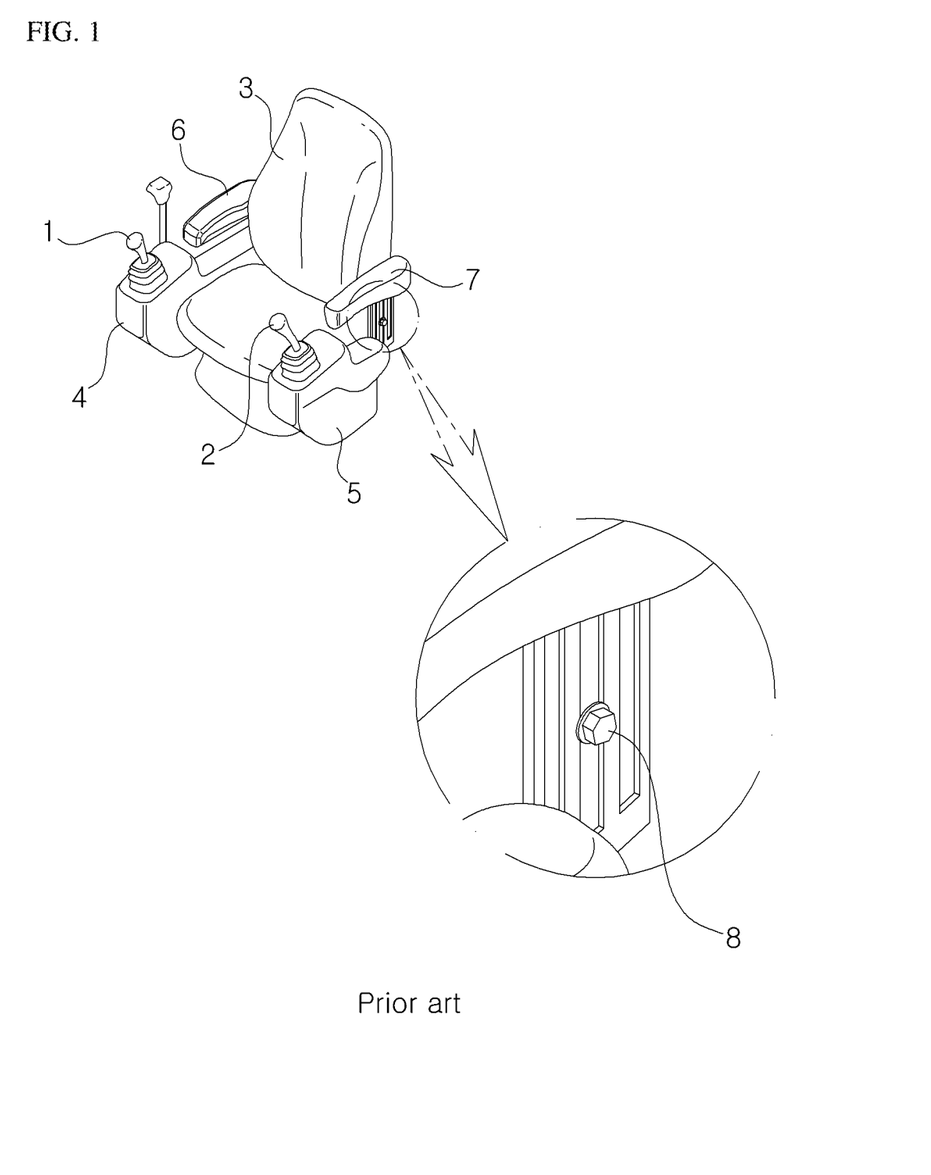
FIG. 1 is a schematic perspective view showing a state in which armrests of a seat for a construction machine have been mounted in accordance with the prior art.
Figure 2:
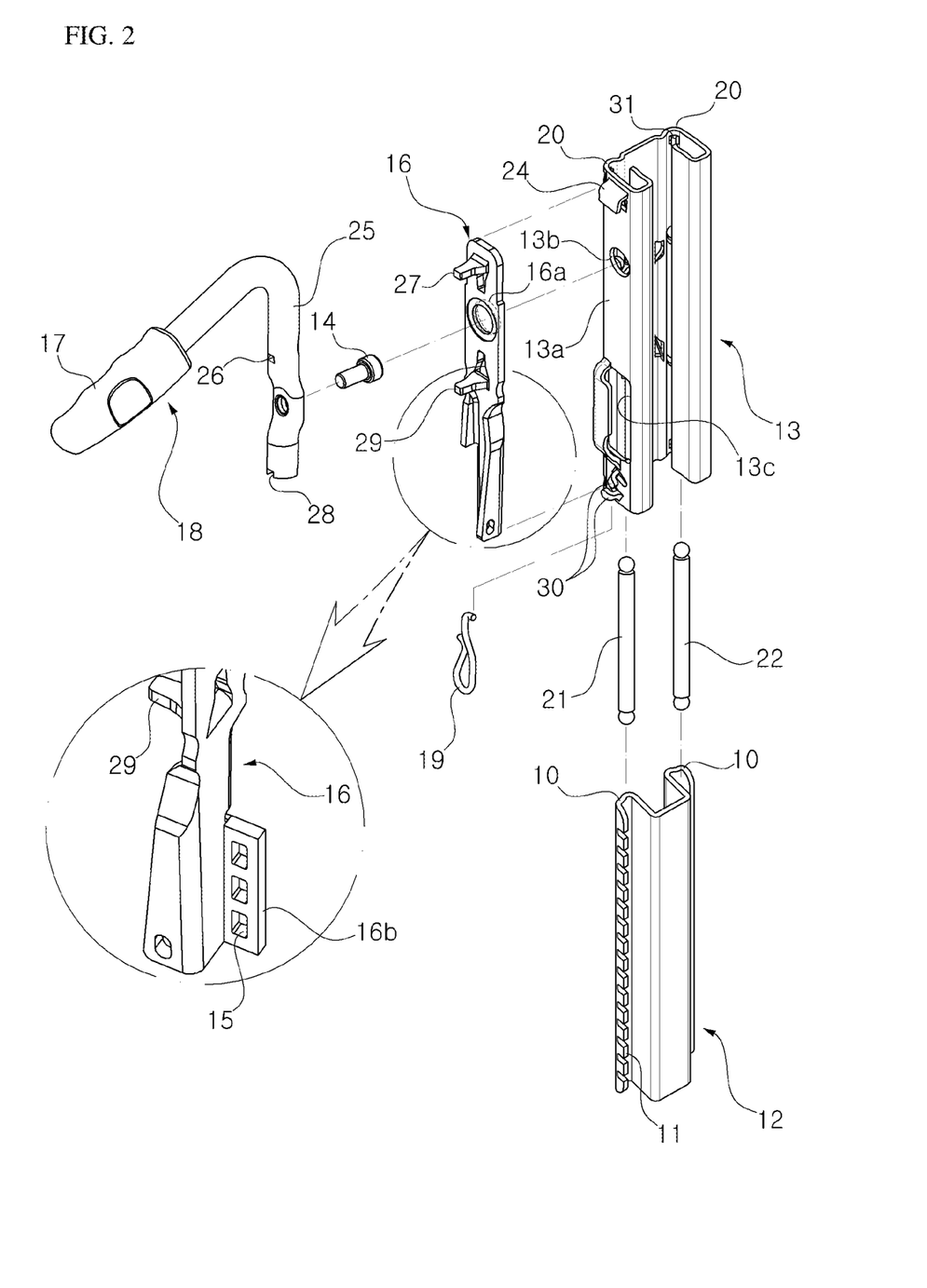
FIG. 2 is an exploded perspective view showing an apparatus for adjusting the height of armrests of a seat for a construction machine in accordance with an embodiment of the present invention.
Figure 3:
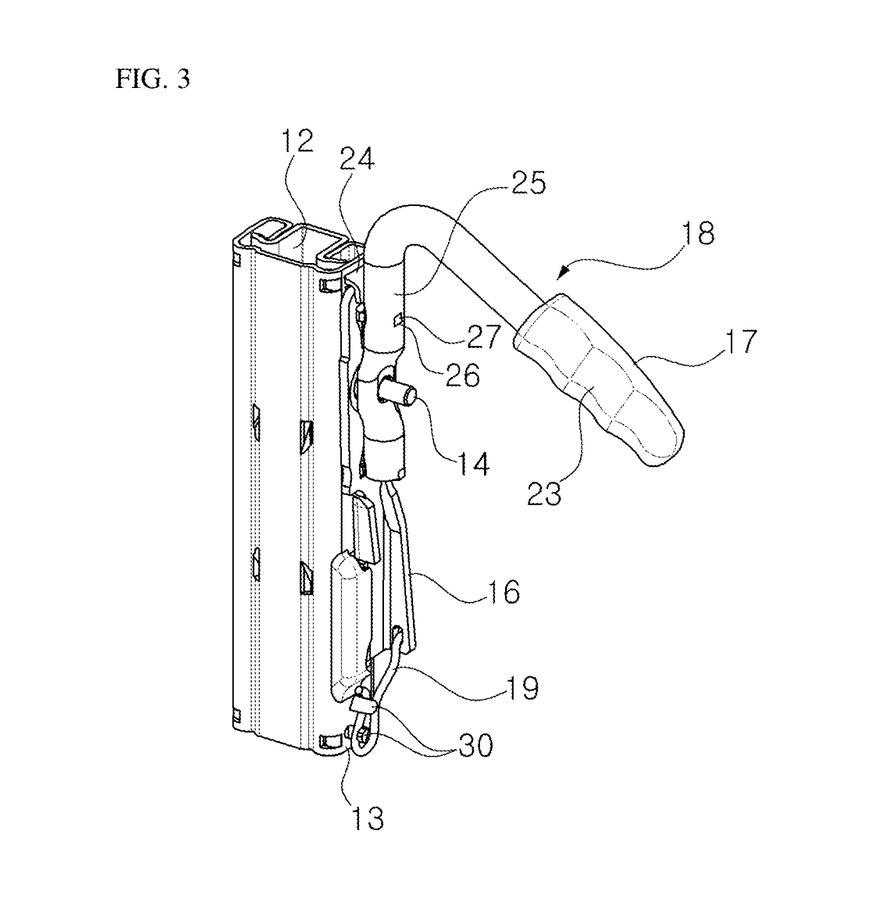
FIG. 3 is an assembled perspective view showing an apparatus for adjusting the height of armrests of a seat for a construction machine in accordance with an embodiment of the present invention.
Figure 4:
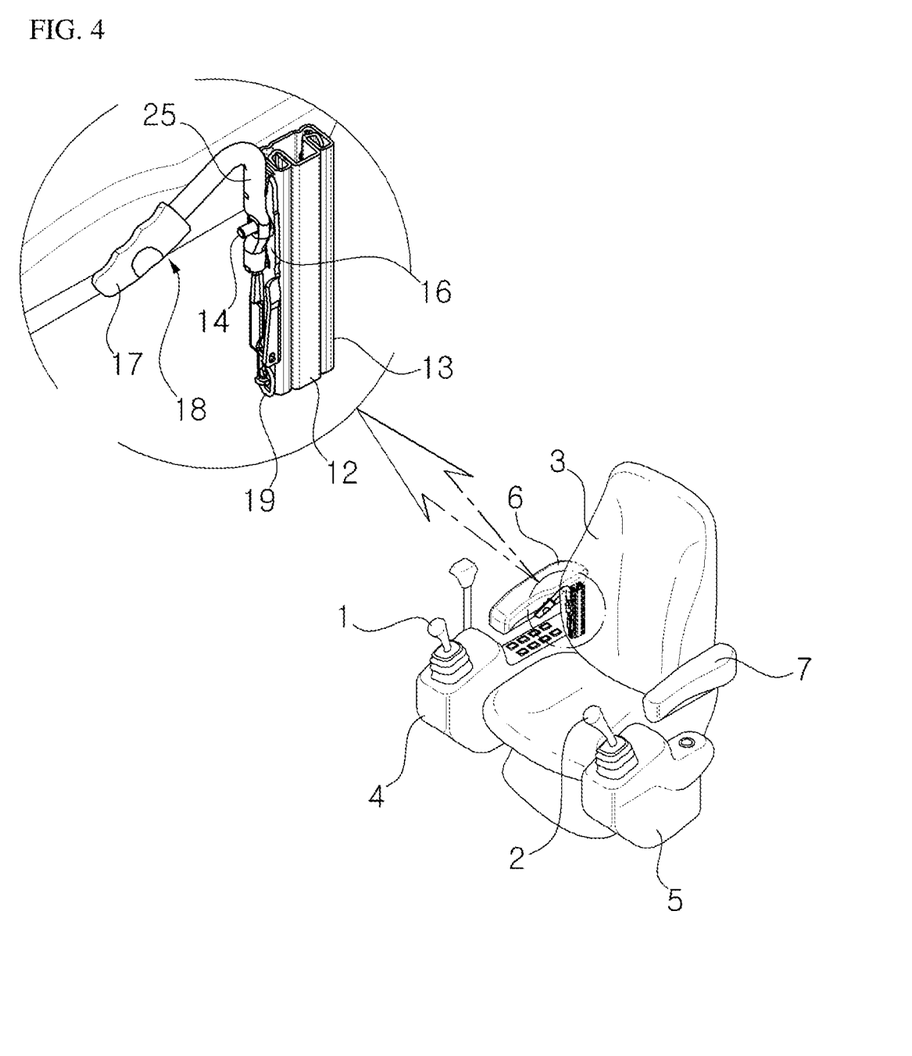
FIG. 4 is a perspective view showing a use state of an apparatus for adjusting the height of armrests of a seat for a construction machine in accordance with an embodiment of the present invention.

As shown in FIG. 1, manipulation levers (i.e., RCV levers) 1 and 2 for controlling an attachment such as a boom are respectively mounted on console boxes 4 and 5 disposed on the left and right sides of an operator's seat 3, and armrests 6 and 7 are respectively mounted on the left and right sides of the operator's seat 3 so that the operator can put his or her arms on the armrests during a long time work through the manipulation of the manipulation levers 1 and 2.

In this case, the armrests 6 and 7 are integrally fixed to both sides of the operator's seat 3 by means of a bolt or the like, which makes it impossible to adjust the vertical movement of the armrests 6 and 7. On the other hand, since the armrests 6 and 7 can be rotated vertically, it can be rotated toward the operator's seat 3.

Thus, in the case where the manipulation levers 1 and 2 are manipulated to perform a long time work, the operator' arms are put on the armrests 6 and 7 in a non-close contact manner, thereby causing a problem in that the operator's fatigue is aggravated.

Further, the conventional armrests entail a problem in that the height of the armrests 6 and 7 are required to be adjusted depending on the operator's various physical conditions and the vertical movement of the armrests 6 and 7 integrally fixed to the operator's seat 3 cannot be adjusted, thereby deteriorating user reliability of the construction machine.

SUMMARY OF THE INVENTION

Accordingly, the present invention has been made to solve the aforementioned problems occurring in the prior art, and it is an object of the present invention to provide an apparatus for adjusting the height of armrests of a seat for a construction machine, in which the height of the armrests is adjustable by manipulating a manipulation lever so that an operator can put his or her arms on the armrests in a close contact manner during a work.

Another object of the present invention is to provide an apparatus for adjusting the height of armrests of a seat for a construction machine, in which the height of armrests installed on the left and right sides of an operator's seat can be variably adjusted vertically depending on the operator's physical conditions.

Technical Solution

To achieve the above objects, in accordance with an embodiment of the present invention, there is provided an apparatus for adjusting the height of armrests installed on the left and right sides of an operator's seat for a construction machine, the apparatus including:

an inner rail mounted on both sides of the operator's seat and including a guide rail part which has one or more engagement projections are formed thereon in such a manner as to be spaced apart from each other at equal intervals in a vertical direction;

an outer rail coupled to the inner rail in a vertically slidable manner and mounted on both sides of the armrests;

a locker rotatably mounted on an outer surface of the outer rail and having one or more locking grooves formed on a lower end thereof so as to allow the engagement projections of the inner rail to be detachably fittingly engaged therein;

an adjustment lever fixed to the locker and having a handle grip formed at one side thereof so that when the handle grip is pressed to cause the locker to be rotated about a fixing pin, the engagement projections are disengaged from the locking grooves; and a connection member configured to connect the lower end portion of the locker to a lower end portion of the outer rail.

In accordance with a preferred embodiment of the present invention, the apparatus may further include a pair of stoppers movably coupled between the guide rail part of the inner rail and a bent part of the outer rail, which faces the guide rail part, and configured to adjust the vertical movement amount of the outer rail with respect to the inner rail and prevent the outer rail from being separated from the inner rail.

The connection member may be formed in the shape of a wire having elasticity so that the engagement projections of the inner rail are fittingly engaged in the locking grooves of the locker when the locker returns to its initial position by an elastic force of the connection member upon the removal of an external force by which the control lever has been rotated.

The handle grip of the adjustment lever may have a grip part formed on an outer surface thereof.

The outer rail may include a support piece formed at an upper end of the outer surface thereof and configured to pressingly support an upper end portion of the locker toward the outer rail so as to prevent that the locker 16 from being separated from the outer rail when the adjustment lever 18 is pressed to cause the locker to be rotated about the fixing pin.

The engagement projections of the inner rail, which are fittingly engaged in the locking grooves of the locker may be formed in the shape of gear teeth so that the locking parts of the inner rail and the outer rail have durability against a load that is applied to the armrests.

The adjustment lever may include a first engagement groove penetratingly formed on one side of a rod part thereof and a second engagement groove formed at a distal end of the rod part thereof, and the locker may include a first projecting piece protrudingly formed on thereon so as to be fittingly engaged in the first engagement groove and a second projecting piece protrudingly formed on thereon so as to be fittingly engaged into the second engagement groove, whereby the control lever is securely fixed to the locker through the fitting engagement between the first and second projection pieces and the first and second engagement grooves, respectively.

Advantageous Effect

The apparatus for adjusting the height of armrests of a seat for a construction machine for a construction machine in accordance with an embodiment of the present invention as constructed above has the following advantages.

The height of the armrests is adjustable by manipulating a manipulation lever so that an operator can put his or her arms on the armrests in a close contact manner during a work, thereby providing convenience to the operator. In addition, the height of armrests can be variably adjusted vertically depending on the operator's various physical conditions, thereby ensuring reliability of the construction machine.

BRIEF DESCRIPTION OF THE DRAWINGS

The above objects, other features and advantages of the present invention will become more apparent by describing the preferred embodiments thereof with reference to the accompanying drawings, in which.

EXPLANATION ON REFERENCE NUMERALS OF MAIN ELEMENTS IN THE DRAWINGS

10: frames
10: guide rail part
12: inner rail
14: fixing pin
16: locker
18: adjustment lever
20: bent part
22: stopper
24: support piece
26: first engagement groove
28: second engagement groove

DETAILED DESCRIPTION OF THE INVENTION

Now, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

As shown in FIGS. 2 to 8, an apparatus for adjusting the height of armrests installed on the left and right sides of an operator's seat for a construction machine includes:

an inner rail 12 mounted on both sides of the operator's seat 3 and including a guide rail part 10 which has a plurality of engagement projections 11 are formed thereon in such a manner as to be spaced apart from each other at equal intervals in a vertical direction;

an outer rail 13 coupled to the inner rail 12 in a vertically slidable manner and mounted on both sides of the armrests;

a locker 16 mounted on an outer surface of the outer rail 13 in such a manner as to be rotated about a fixing pin 15, the locker having an engagement protrusion 16a formed on a rear surface thereof so as to be fittingly engaged in an engagement hole 13b formed on a guide rail part 13a of the outer rail 13 and a plurality of locking grooves 15 formed on a lower end portion thereof so as to allow the engagement projections 11 of the inner rail 12 to be detachably fittingly engaged therein;

an adjustment lever 18 fixed to the locker 16 and having a handle grip 17 formed at one side thereof so that when the handle grip 17 is pressed to cause the locker 16 to be rotated about a fixing pin 14, the engagement projections 11 are disengaged from the locking grooves 15; and a connection member 19 configured to connect the lower end portion of the locker 16 to a lower end portion of the outer rail 13.

Figure 5:
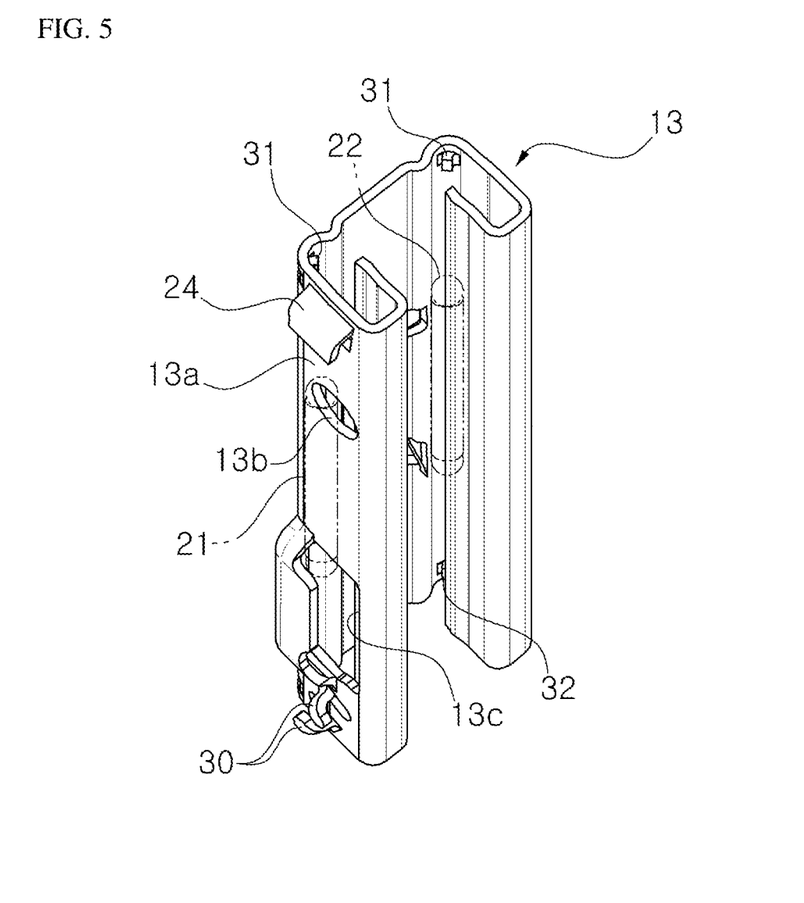
FIG. 5 is a perspective view showing a use state of stoppers for preventing an outer rail from escaping from an inner rail in an apparatus for adjusting the height of armrests of a seat for a construction machine in accordance with an embodiment of the present invention.

In this case, the apparatus includes a pair of stoppers 21 and 22 movably coupled between the guide rail part 10 of the inner rail 12 and a bent part 20 of the outer rail 13, which faces the guide rail part 10, and configured to adjust the vertical movement amount of the outer rail 13 with respect to the inner rail 12 and prevent the outer rail 13 from being separated from the inner rail 12.

The connection member 19 is formed in the shape of a wire having elasticity so that the engagement projections 11 of the inner rail 12 are fittingly engaged in the locking grooves 15 of the locker 16 when the locker 16 returns to its initial position by an elastic force of the connection member 19 upon the removal of an external force by which the control lever 18 has been rotated.

The handle grip 17 of the adjustment lever 18 has a grip part 23 formed on an outer surface thereof.

The outer rail 13 includes a support piece 24 formed at an upper end of the outer surface thereof and configured to pressingly support an upper end portion of the locker 16 toward the outer rail 13 so as to prevent that the locker 16 from being separated from the outer rail 13 when the adjustment lever 18 is pressed to cause the locker 16 to be rotated about the fixing pin 14.

The engagement projections 11 of the inner rail 12, which are fittingly engaged in the locking grooves 15 of the locker 16 is formed in the shape of gear teeth (e.g., gear teeth constituting a rack gear) so that the locking parts of the inner rail 12 and the outer rail 13 have durability against a load that is applied to the armrests 6 and 7.

Figure 8:
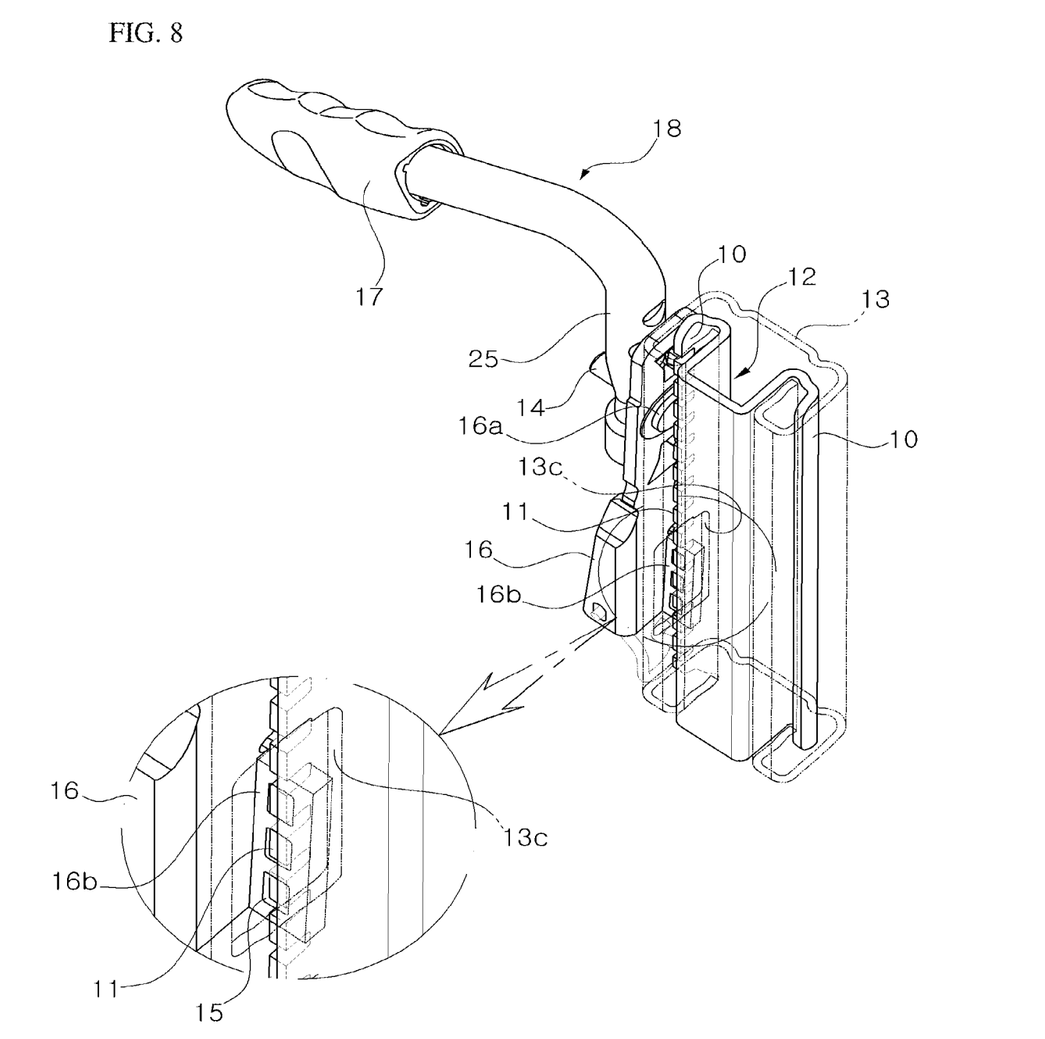
FIG. 8 is a perspective view showing the main elements of an apparatus for adjusting the height of armrests of a seat for a construction machine in accordance with an embodiment of the present invention.

The adjustment lever 18 includes a first engagement groove 26 penetratingly formed on one side of a rod part 25 thereof and a second engagement groove 28 formed at a distal end of the rod part thereof, and the locker 16 includes a first projecting piece 27 protrudingly formed on thereon so as to be fittingly engaged in the first engagement groove 26 and a second projecting piece 29 protrudingly formed on thereon so as to be fittingly engaged into the second engagement groove 28, so that the control lever 18 is securely fixed to the locker 16 through the fitting engagement between the first and second projection pieces 27 and 29 and the first and second engagement grooves 26 and 28, respectively.

A non-explained reference numeral 13c in the drawings denotes a cut-out part that is penetratingly formed at a lower end portion of the guide rail part 13a of the outer rail 13 so as to allow a projecting part 16b formed with the locking grooves 15 of the locker 16 to be inserted thereto. In addition, a non-explained reference numeral 30 denotes a pair of holders formed at the lower end portion of the outer surface of the outer rail 13 in such a manner as to be protruded in the opposite directions to each other, and configured to support the lower end of the connection member 19 to prevent the connection member 19 from being separated from the outer rail 13 during the rotation of the locker 16.

Hereinafter, use example of an apparatus for adjusting the height of armrests of a seat for a construction machine in accordance with an embodiment of the present invention will be described in detail with reference to the accompanying drawings.

As described above, the apparatus for adjusting the height of armrests of a seat for a construction machine is mounted on each of the left and right armrests 6 and 7 of the operator's seat 3. Herein, the configurations of the apparatuses for adjusting the height of armrests 6 and 7 are the same as each other, and thus only a configuration of apparatus for adjusting the height of the armrest 6 will be described hereinafter.

As shown in FIGS. 2 to 8, the height of the armrest 6 can be variably adjusted depending on an operator's physical conditions. In other words, when an operator seated on the operator's seat 3 pulls the grip part 23 of the handle grip 17 of the adjustment lever 18 toward him or her with him or her gripping the grip part 23, the locker 16 integrally fixed to the rod part 25 of the adjustment lever 18 is rotated about the fixing pin 14 in a state of coming into close contact with the outer surface of the outer rail 13. That is, the engagement protrusion 16a formed on the rear surface of the locker 16 is rotated about the engagement hole 13b formed on the guide rail part 13a of the outer rail 13.

In this case, the upper end portion of the locker 16 is supported by the support piece 24 formed at the upper end of the outer surface of the outer rail 13, and thus the upper end of the locker 16 is prevented from being separated from the outer rail 13 during the rotation of the locker 16 about the fixing pin 14.

Meanwhile, the locker 16 can be rotated within a range of the length and the elastic force of the connection member 29 that connects the lower end portion of the locker 17 to the lower end portion of the outer rail 13.

Figure 6A:
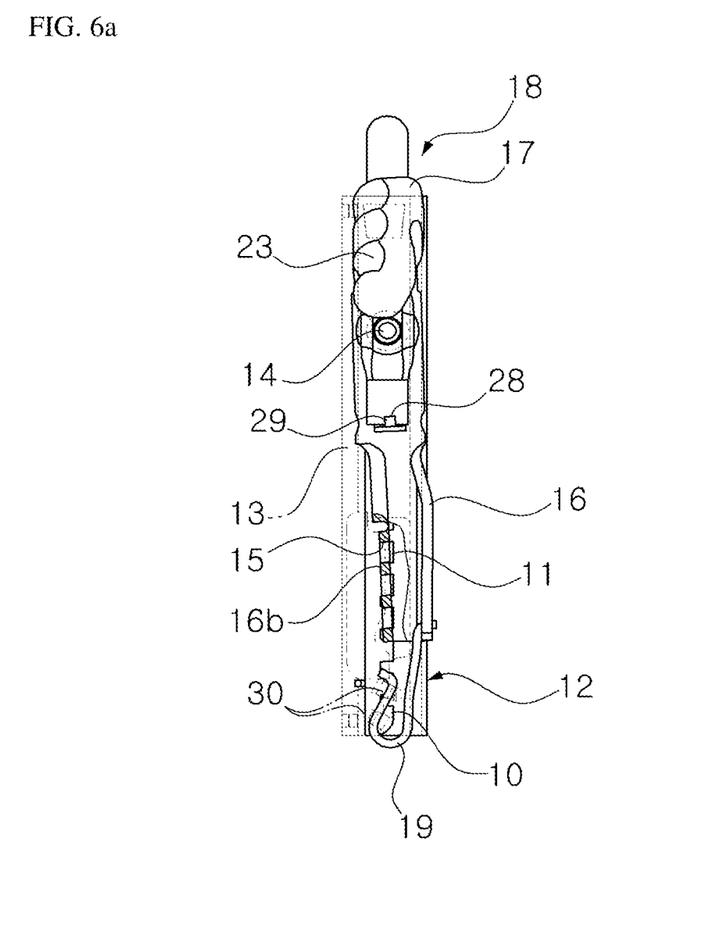
FIGS. 6(a) and 6(b) are views showing the locked and unlocked state of the locking part of an outer rail with respect to an inner rail in an apparatus for adjusting the height of armrests of a seat for a construction machine in accordance with an embodiment of the present invention.
Figure 6B:
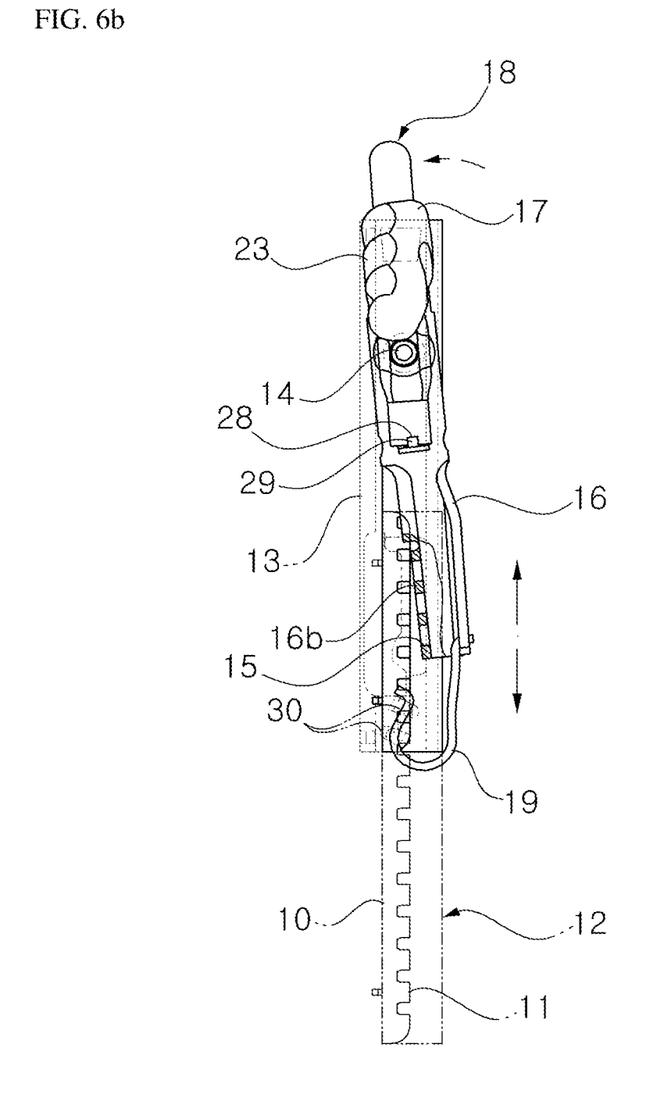
Figure 7:
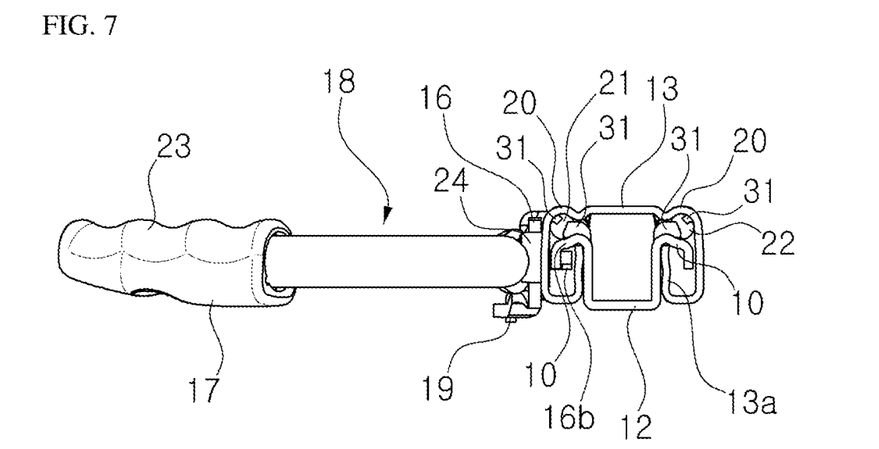
FIG. 7 is a top plan view showing an apparatus for adjusting the height of armrests of a seat for a construction machine in accordance with an embodiment of the present invention.

For this reason, the locked state of the locking part of the outer rail fixed to a side of the armrest 6 is released with respect to the inner rail 2 fixed to a side of the operator's seat 3. In other words, the handle grip 17 of the adjustment lever 18 is pressed to cause the locker 16 to be rotated about the fixing pin 14 so that the engagement projections 11 vertically equidistantly formed on the guide rail part 10 of the inner rail 12 escape from the locking grooves 15 of the locker 16.

Thus, the outer rail 13 can be lifted upwardly relative to the inner rail 12. In other words, the outer rail 13 is slidably moved upwardly in a state in which the guide rail part 13a thereof comes into close contact with the guide rail part 10 of the inner rail 12. In this case, the vertical movement amount of the outer rail 13 with respect to the inner rail 12 can be adjusted and simultaneously the outer rail 13 can be prevented from separated from the inner rail 12 by a pair of stoppers 21 and 22 coupled between the guide rail part 10 of the inner rail 12 and the bent part 20 of the outer rail 13 which faces the guide rail part 10.

In the meantime, the stoppers 21 and 22 can be moved vertically by a preset distance by retaining parts 31 and 32 formed respectively at the upper and lower portions of the inner surface of the outer rail 13 and the inner rail 12.

As described above, when the adjustment lever 18 is pressed to cause the locker 16 to be rotated, the locked state of the outer rail 13 is released with respect to the inner rail 12 so that the height of the armrest 6 can be adjusted by vertically lifting the armrest 6 to fit the operator's physique.

On the other hand, when an external force is removed by which the adjustment lever 18 has been pressed after the adjustment of the height of the armrest 6 to fit the operator's physique, the locker 16 is rotated about the fixing pin 14 and returns to its original position by means of an elastic force of the connection member 19. For this reason, the engagement projections 11 formed on the guide rail part 10 of the inner rail 12 are fittingly engaged in the locking grooves 15 formed on the lower end portion of the locker 16.

In this case, the fitting engagement between the engagement projections 11 of the inner rail 12 and the locking grooves 15 of the locker 16 are achieved in the same manner as the mutual engagement of the gear teeth, and thus the locking parts of the inner rail 12 and the outer rail 13 have durability against a load that is applied to the armrest 6.

Industrial Applicability

In accordance with the present invention as constructed above, the height of the armrests of a seat for a construction machine is variably adjusted so that an operator can put his or her arms on the armrests in a close contact manner during a work, thereby providing convenience to the operator. In addition, the present invention has an advantageous effect in that the height of the armrests of a seat can be variably adjusted vertically to fit an operator's physique during the work.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the above-mentioned embodiments but should be defined by the appended claims and equivalents thereof.

The invention claimed is:

1. An apparatus for adjusting the height of armrests installed on the left and right sides of an operator's seat for a construction machine, the apparatus comprising:
   an inner rail mounted on both sides of the operator's seat and including a guide rail part which has one or more engagement projections are formed thereon in such a manner as to be spaced apart from each other at equal intervals in a vertical direction;
   an outer rail coupled to the inner rail in a vertically slidable manner and mounted on both sides of the armrests;
   a locker rotatably mounted on an outer surface of the outer rail and having one or more locking grooves formed on a lower end thereof so as to allow the engagement projections of the inner rail to be fittingly engaged therein;
   an adjustment lever fixed to the locker and having a handle grip formed at one side thereof so that when the handle grip is pressed to cause the locker to be rotated about a fixing pin, the engagement projections are disengaged from the locking grooves; and a connection member configured to connect the lower end portion of the locker to a lower end portion of the outer rail.

2. The apparatus according to claim 1, further comprising a pair of stoppers movably coupled between the guide rail part of the inner rail and a bent part of the outer rail, which faces the guide rail part, and configured to adjust the vertical movement amount of the outer rail with respect to the inner rail and prevent the outer rail from being separated from the inner rail.

3. The apparatus according to claim 1, wherein the connection member is formed in the shape of a wire having elasticity so that the engagement projections of the inner rail are fittingly engaged in the locking grooves of the locker when the locker returns to its initial position by an elastic force of the connection member upon the removal of an external force by which the control lever has been rotated.

4. The apparatus according to claim 1, wherein the handle grip of the adjustment lever has a grip part formed on an outer surface thereof.

5. The apparatus according to claim 1, wherein the outer rail comprises a support piece formed at an upper end of the outer surface thereof and configured to pressingly support an upper end portion of the locker toward the outer rail so as to prevent that the locker from being separated from the outer rail when the adjustment lever is pressed to cause the locker to be rotated about the fixing pin.

6. The apparatus according to claim 1, wherein the engagement projections of the inner rail, which are fittingly engaged in the locking grooves of the locker is formed in the shape of gear teeth so that the locking parts of the inner rail and the outer rail have durability against a load that is applied to the armrests.

7. The apparatus according to claim 1, wherein the adjustment lever comprises a first engagement groove penetratingly formed on one side of a rod part thereof and a second engagement groove formed at a distal end of the rod part thereof, and the locker comprises a first projecting piece protrudingly formed on thereon so as to be fittingly engaged in the first engagement groove and a second projecting piece protrudingly formed on thereon so as to be fittingly engaged into the second engagement groove, whereby the control lever is securely fixed to the locker through the fitting engagement between the first and second projection pieces and the first and second engagement grooves, respectively.

* * * * *